United States Patent
Brown et al.

[19]

[11] Patent Number: 5,806,560
[45] Date of Patent: Sep. 15, 1998

[54] AIRCRAFT FUEL TRANSFER PUMP WITH AUXILIARY FUEL LINE SCAVENGE PUMP

[75] Inventors: Albert W. Brown, Newport Beach; John Pickett, Laguna Beach; Dino C. Scanderbeg, Laguna Niguel, all of Calif.

[73] Assignee: J. C. Carter Company, Inc., Costa Mesa, Calif.

[21] Appl. No.: 734,816

[22] Filed: Oct. 22, 1996

[51] Int. Cl.⁶ ........................................ E03B 5/00
[52] U.S. Cl. .......................... 137/566; 417/84; 417/89; 417/199.2
[58] Field of Search ............... 137/566; 417/84, 417/88, 89, 151, 175, 200, 199.2, 87

[56] References Cited

U.S. PATENT DOCUMENTS

| Re. 35,404 | 12/1996 | Brown . | |
|---|---|---|---|
| 1,704,362 | 3/1929 | Johnson . | |
| 2,349,131 | 5/1944 | Anderson . | |
| 2,390,332 | 12/1945 | Schmidt . | |
| 2,665,646 | 1/1954 | Garrett et al. | 417/84 |
| 2,934,021 | 4/1960 | Conery et al. | 417/87 |
| 3,178,153 | 4/1965 | Jacomet . | |
| 3,420,181 | 1/1969 | Berry | 417/84 |
| 3,652,186 | 3/1972 | Carter . | |
| 3,653,785 | 4/1972 | Dahlgren et al. . | |
| 3,659,674 | 5/1972 | Ferrario . | |
| 3,729,273 | 4/1973 | Shimrony | 417/151 |
| 3,947,154 | 3/1976 | Klepp et al. . | |
| 4,339,917 | 7/1982 | LaGrone | 137/566 |
| 4,515,180 | 5/1985 | Napolitano | 417/200 |
| 4,682,936 | 7/1987 | Suzuki et al. . | |
| 4,704,070 | 11/1987 | Iseman | 417/89 |
| 4,775,293 | 10/1988 | Boster . | |
| 4,883,410 | 11/1989 | Goddard et al. | 417/89 |
| 5,015,156 | 5/1991 | Scholz . | |
| 5,051,071 | 9/1991 | Haentjens . | |
| 5,215,430 | 6/1993 | Brown . | |

FOREIGN PATENT DOCUMENTS 914077  12/1962  United Kingdom ................ 417/88

*Primary Examiner*—Denise L. Ferensic
*Assistant Examiner*—John Ball
*Attorney, Agent, or Firm*—Kelly Bauersfeld Lowry & Kelley, LLP

[57] ABSTRACT

An improved fuel transfer pump is provided for relatively high flow transfer of fuel from one aircraft to another during an inflight refueling procedure, wherein the fuel transfer pump includes a jet-type scavenge pump for evacuating residual fuel from a fuel line or manifold. The scavenge pump comprises a venturi element connected along a recirculation conduit through which a small fuel flow is diverted from the high pressure discharge side of the fuel transfer pump for return to the fuel tank. The recirculation fuel flow induces a vacuum in a suction throat of the venturi element, and this vacuum is coupled by a suction line to evacuate residual fuel from the fuel line or manifold to the fuel tank. A flow baffle is mounted along the recirculation conduit downstream from the venturi element to ensure flooding and priming of the scavenge pump.

13 Claims, 2 Drawing Sheets

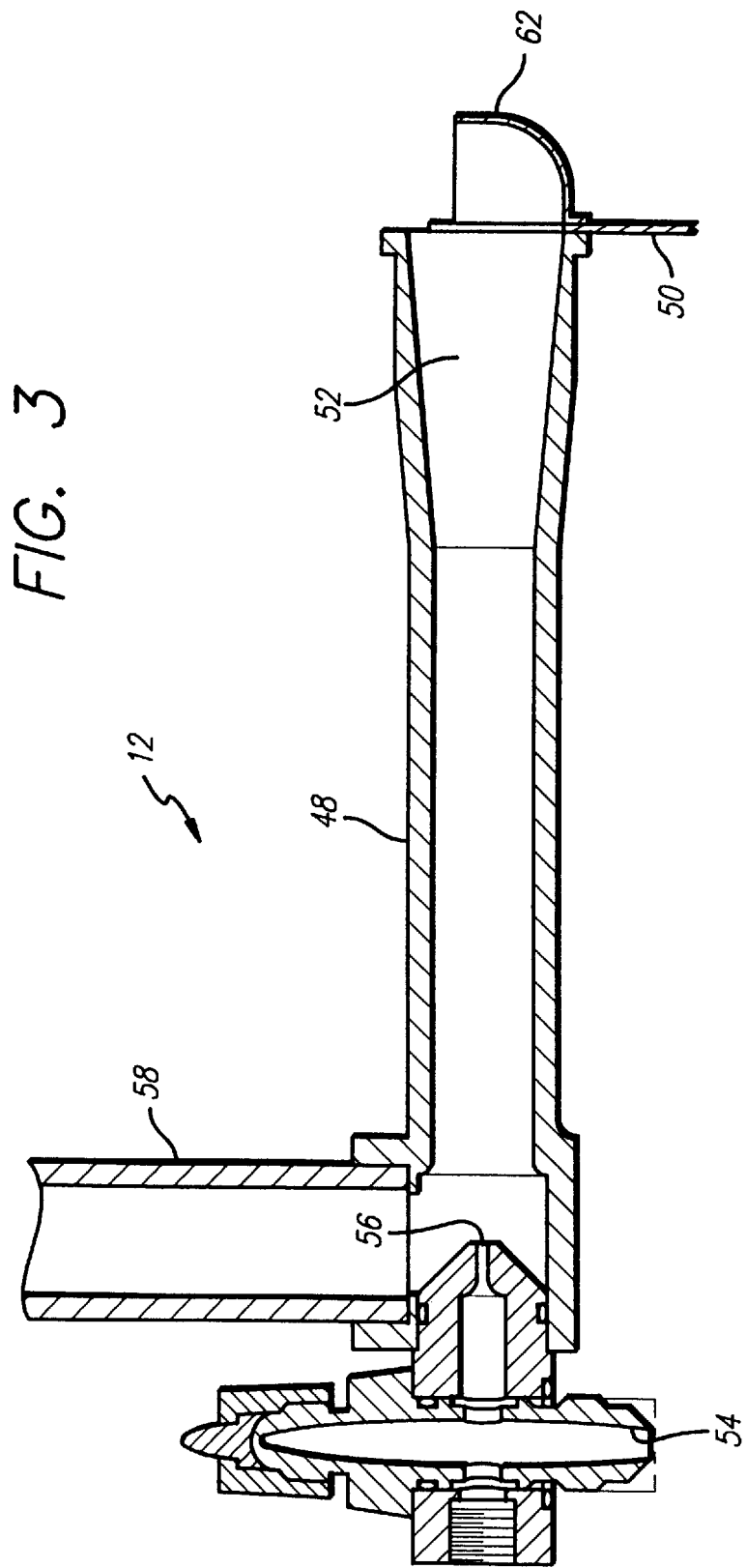

AIRCRAFT FUEL TRANSFER PUMP WITH AUXILIARY FUEL LINE SCAVENGE PUMP

BACKGROUND OF THE INVENTION

This invention relates generally to improvements in fuel transfer pumps of the type used for inflight refueling of aircraft. More particularly, this invention relates to an improved fuel transfer pump equipped with an auxiliary scavenge pump for evacuating residual fuel from a fuel line or manifold at the conclusion of an inflight refueling procedure.

Fuel transfer pumps for inflight aircraft refueling applications are generally known in the art, and typically comprise a plurality of submersible pump units mounted directly within the reservoir fuel tank of a tanker aircraft. The pump units each include an impeller driven by an hydraulic motor to deliver fuel at a relatively high flow rate through an off-loading fuel line and appropriate releasable coupling to refuel another aircraft. Significant research effort in such pump units has been directed to the development of a design which is substantially explosion proof, particularly with respect to explosion hazard created by overheating of impeller bearings when the tank is substantially drained of fuel. See, for example, U.S. Pat. No. 5,215,430.

In some instances, it is necessary or desirable for the primary fuel tanks of a tanker aircraft to be refueled while in flight. During such refueling procedure, fuel is off-loaded from a second tanker aircraft by appropriate operation of fuel transfer pumps located on the second aircraft, for flow through an appropriate releasable coupling and an on-loading fuel line and/or manifold to refill the primary fuel tanks. However, when this tanker refueling procedure is completed, it is necessary to evacuate residual fuel trapped in the fuel line or manifold of the refueled transfer aircraft, wherein these fuel flow passages are typically located to pass through or in close proximity to aircraft cabin spaces.

In the past, residual fuel trapped in the fuel line or manifold has been evacuated to the main reservoir fuel tanks by connecting the fuel line to the suction side of a vapor removal pump provided to improve high altitude performance when the main fuel transfer pumps are operated. However, in an improved explosion proof fuel transfer pump of the type described in U.S. Pat. No. 5,215,430, such vapor removal pump is not necessary and is thus not provided.

There exists, therefore, a need for an effective and improved means for evacuating residual fuel from the fuel line or manifold of a tanker aircraft, particularly in conjunction with an explosion proof fuel transfer pump of the type described in U.S. Pat. No. 5,215,430. The present invention fulfills this need and provides further related advantages.

SUMMARY OF THE INVENTION

In accordance with the invention, an improved fuel transfer pump is provided for use in aircraft inflight refueling systems, wherein the improved fuel transfer pump includes an auxiliary jet-type scavenge pump for use in evacuating residual fuel trapped within a fuel line or manifold within the aircraft at the conclusion of a refueling procedure.

The fuel transfer pump comprises a submersible pump adapted for mounting directly within the reservoir fuel tank of a tanker aircraft, and includes an hydraulic motor for rotatably driving an impeller which delivers the fuel through a high pressure outlet for flow to another aircraft being refueled. The fuel transfer pump of this type is typically provided as one of several pumps in a system, all of which are mounted within the fuel tanks and adapted for concurrent operation for high flow delivery of fuel to the receiver aircraft. In the preferred system, the auxiliary jet-type scavenge pump is provided on one of the multiple fuel transfer pumps.

The scavenge pump comprises a venturi element connected along a recirculation conduit having an upstream end tapped into the high pressure discharge side of the fuel transfer pump, and a downstream end in open flow communication with the fuel tank. The venturi element has a suction throat coupled by a suction line to the fuel line or manifold to be evacuated. When fuel line evacuation is desired, the fuel transfer pump equipped with the scavenge pump is operated to provide pressurized fuel at the discharge side thereof. A portion of this pressurized fuel is recirculated through the scavenge pump, resulting in the application of a vacuum to the suction line which effectively evacuates residual fuel from the fuel line or manifold to the fuel tank.

In accordance of one aspect of the invention, a flow baffle is mounted along the recirculation conduit at a location downstream from the venturi element. This flow baffle is designed to ensure flooding of the venturi element with fuel, sufficient to prime the scavenge pump so that the desired vacuum will be generated to draw fuel through the suction line to the fuel tank.

Other features and advantages of the present invention will become more apparent from the following detailed description, taken in conjunction with the drawings which illustrate, by way of example, the principles of the invention.

BRIEF DESCRIPTION OF THE DRAWING

The accompanying drawings illustrate the invention. In such drawings:

FIG. 3 is an enlarged fragmented sectional view taken generally on the line 3—3 of FIG. 2.

DETAILED DESCRIPTION OF THE PREFERRED EMBODIMENT

Figure 1:
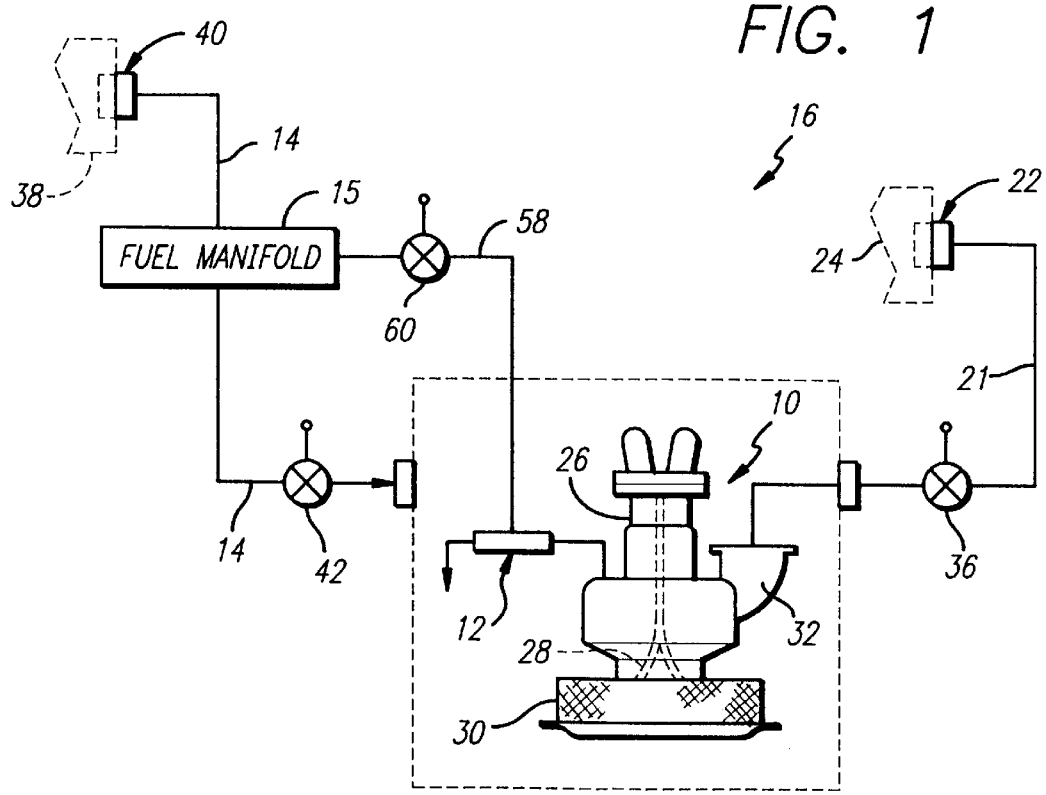
FIG. 1 is a schematic diagram illustrating an inflight refueling system for aircraft, including a fuel transfer pump equipped with an auxiliary fuel line scavenge pump in accordance with the invention.

As shown in the exemplary drawings, an improved fuel transfer pump referred to generally by the reference numeral 10 is provided for use in an inflight aircraft refueling system. The fuel transfer pump 10 is equipped with an auxiliary fuel line scavenge pump 12 for evacuating residual fuel from a fuel line 14 or associated manifold 15 of an aircraft.

A refueling system for a tanker aircraft is shown generally by the reference numeral 16 in schematic form in FIG. 1. The refueling system 16 is designed primarily to deliver fuel 18 from a main reservoir fuel tank or tanks 20 on the tanker aircraft, through an off-loading fuel line 21 and a coupling assembly 22 to a receiver aircraft 24. The coupling assembly 22 is designed, as is known in the art, to incorporate a pair of coupling members adapted for releasible inflight interconnection so that the refueling procedure can take place while the tanker aircraft and receiver aircraft are inflight generally in tandem to each other. The refueling system 16 generally includes one or more of the fuel transfer pumps 10 mounted directly within the main reservoir fuel tank 20. Each fuel transfer pump 10 is of a submersible pump design, preferably in accordance with the explosion proof pump shown and described in U.S. Pat. No. 5,215,430 which is incorporated by reference herein. The fuel transfer pump 10 includes an hydraulic motor 26 for rotatably driving an impeller 28 to draw in fuel through an intake 30, and to discharge that fuel under pressure through a pump outlet 32 and the off-loading fuel line 21 to the coupling assembly 22 and the receiver aircraft. As shown, a control valve 36 is typically provided along the off-loading fuel line 21.

It may be periodically necessary to replenish the fuel supply contained within the main or primary wing tanks 23 of the tanker aircraft, by way of an inflight refueling procedure during which fuel is delivered from a second, resupply tanker aircraft 38 equipped with a similar refueling system. In this regard, the two tanker aircraft include engaging releasable components of a second coupling assembly 40 through which fuel can be off-loaded from the resupply aircraft 38, through the fuel line 14 and manifold 15 to refill the main wing tanks 23. As shown, a control valve 42 is normally provided along the fuel line 14, at a location near the fuel tank 23. The intake fuel line 14 and the manifold 15 are typically located or otherwise pass through or in close proximity to one or more cabin areas of the tanker aircraft. The present invention is directed to evacuation of residual fuel in the fuel line 14 and/or the manifold 15, subsequent to inflight refueling of the tanker aircraft.

Fuel line evacuation occurs by operation of the scavenge pump 12, which is provided with one of the fuel transfer pumps 10 mounted within the fuel tank 20. In general, the scavenge pump 12 comprises a small venturi-type jet pump through which a small fuel flow is recirculated to the fuel tank 20, each time the fuel transfer pump 10 is operated. This venturi-type jet pump provides a simple yet effective structure, having no moving parts, for inducing a small vacuum that can be used to evacuate residual fuel from the fuel line 14.

Figure 2:
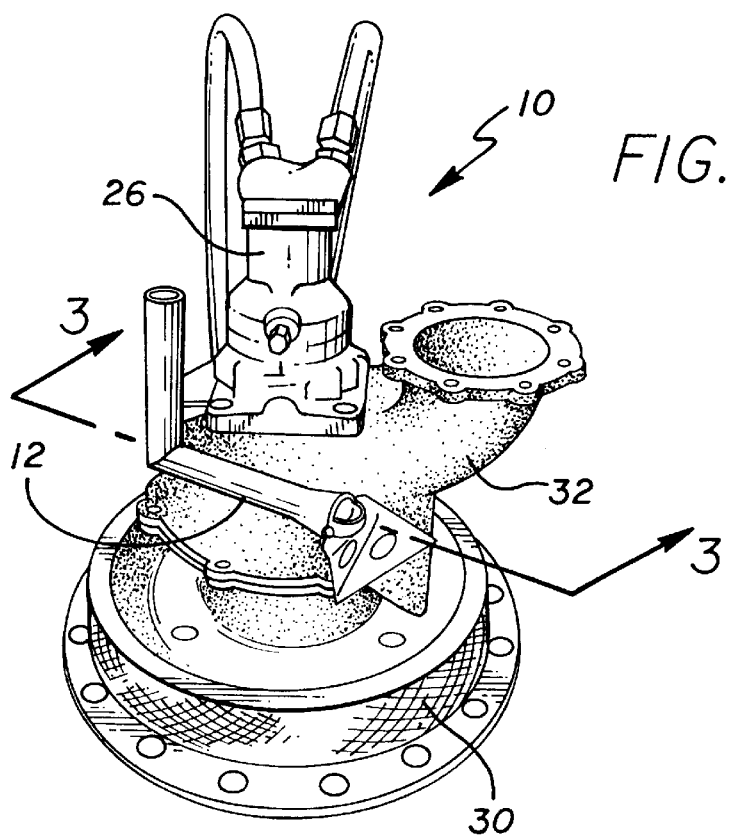
FIG. 2 is a fragmented perspective view illustrating the fuel transfer pump with auxiliary scavenge pump.

More specifically, as shown best in FIGS. 2 and 3, the scavenge pump 12 comprises a relatively short recirculation conduit 48 mounted by a bracket 50 or the like onto the exterior of the high pressure discharge housing 52 of the fuel transfer pump 10. One end of the recirculation conduit 48 is in flow communication with the interior of the discharge housing 52, via a small bleed port 54. When the fuel transfer pump 10 is operated, a portion of the fuel within the discharge housing 52 is diverted through the bleed port 54 for passage through a narrow injector or jet orifice 56 mounted within the recirculation conduit 48 near the bleed port.

A suction line 58 is connected to the recirculation conduit 48, at a location generally at the outlet side of the injector nozzle 56, which defines a venturi throat at which a vacuum is induced by jet flow through the nozzle 56. This vacuum is coupled via the suction line 58 through an appropriate control valve 60 to the fuel line 14 and/or the fuel manifold 15 associated therewith. When the control valve 60 is open, the vacuum in the suction line 58 is effective to draw fuel from the fuel line 14 and manifold 15 for passage through the suction line 58 to the recirculation conduit 48 of the scavenge pump 12. This vacuum-drawn fuel is merged with the jet flow through the recirculation conduit 12 for return directly into the fuel tank 20.

After the main tanker aircraft has been refueled, evacuation of the fuel line 14 and manifold 15 may be accomplished quickly and easily by operating the fuel transfer pump 12 for a brief time interval with the off-loading control valve 36 in a closed position. The pump 10 thus exhibits a significant fuel pressure in the discharge housing 52, to cause a relatively high pressure fuel flow through the injector nozzle 56. This fuel flow is effective to induce a vacuum for evacuating the fuel line 14, with the on-loading control valve 42 appropriately closed and the suction line valve 60 open during the evacuation step.

In accordance with one aspect of the invention, the scavenge pump 12 is equipped with a flow baffle 62 to insure rapid and proper priming of the scavenge pump 12 when fuel line evacuation is desired. Such priming is particularly important in the event that the discharge end of the recirculation conduit 48 is not submersed in fuel, such as when the main fuel tank is empty or nearly emptied.

The flow baffle 62 comprises an open-sided cup element mounted at the downstream end of the recirculation conduit 48, in a position defining an open downstream end 64. Fuel injected through the nozzle 56 within the recirculation conduit 48 splatters and floods against the flow baffle 62 to thus insure partial filling of the recirculation conduit 48 sufficient to submerge the nozzle 56, before fuel can spill over the upper edge of the baffle 62, for draining directly into the fuel tank 20. Thus, when the fuel transfer pump is operated to evacuate the fuel line 14 and manifold 15, the baffle 62 ensures rapid filling of the recirculation conduit 48, sufficient to ensure the desired venturi suction flow action along the suction line 58.

A variety of modifications and improvements to the invention will be apparent to those skilled in the art. For example, it will be understood that the scavenge pump 12 can be coupled through appropriate valve elements to evacuate residual fuel from the off-loading fuel line 21, if necessary or desirable. Accordingly, no limitation on the invention in intended by way of the foregoing description and accompanying drawings, except as set forth in the appended claims.

What is claimed is:

1. A fuel pump transfer pump, comprising:

a pump housing having an inlet and an outlet, said pump housing being adapted for installation into a fuel tank;

an impeller within said housing for pumping fuel from said inlet to said outlet;

motor means for rotatably driving said impeller; and a scavenge pump mounted on said pump housing, said scavenge pump including a recirculation conduit having an upstream end in flow communication with said outlet and a downstream end in open flow communication with the fuel tank when said pump housing is mounted therein, a venturi element mounted along said recirculation conduit and defining a suction throat, and a suction line connected to said suction throat and adapted to be connected to a fuel line for evacuating fuel from the fuel line to the fuel tank, wherein said scavenge pump further includes a baffle mounted along said recirculation conduit at a location downstream from said venturi element, said baffle sufficiently obstructing fuel flow through said recirculation conduit to insure priming of said venturi element.

2. A fuel transfer pump assembly comprising:

a transfer pump having a pump housing defining an inlet and an outlet and being adapted for mounting within a fuel tank, said transfer pump further including impeller means for pumping fuel from said inlet to said outlet;

a venturi jet pump mounted on said pump housing for recirculating from said outlet to the fuel tank a portion of the fuel pumped by said impeller means when said pump housing is mounted in the fuel tank, said venturi jet pump defining a suction throat; and a suction line connected to said suction throat and adapted to be connected to a fuel line to evacuate fuel therefrom;

wherein said venturi jet pump includes a baffle mounted at a location downstream from said venturi throat, said baffle partially obstructing fuel flow through said venturi jet pump to insure flooding and priming of said jet pump.

3. In a fuel transfer pump for submersible mounting into a reservoir fuel tank of a tanker aircraft having an off-loading fuel line to deliver fuel to an aircraft being refueled and an on-loading fuel line to receive fuel from another tanker aircraft, said fuel transfer pump including a pump housing defining an inlet and an outlet, and impeller means for pumping fuel from said inlet to said outlet, the improvement comprising;

a recirculation conduit mounted on said pump housing and having an upstream end in flow communication with said pump outlet and a downstream end in flow communication with the fuel tank;

a venturi jet pump mounted along the recirculation conduit and defining a suction throat; and a suction line connected between said suction throat and at least one of said fuel lines, whereby fuel is evacuated from said one fuel line through said suction line to the fuel tank;

wherein said venturi jet pump includes a baffle mounted along said recirculation conduit at a location downstream from said venturi element, said baffle sufficiently obstructing fuel flow through said recirculation conduit to insure priming of said venturi element.

4. The fuel tank pump of claim 3 further including valve means for selectively isolating said one fuel line from said fuel tank.

5. The fuel transfer pump of claim 3 wherein said suction line is connected to said on-loading fuel line.

6. A fuel transfer pump for use in an inflight aircraft refueling system, comprising:

a pump housing having an inlet and an outlet, said pump housing being installed into an aircraft fuel tank;

an impeller within said housing for pumping fuel from said inlet to said outlet;

motor means for rotatably driving said impeller; and a scavenge pump mounted on the exterior of said pump housing by an attachment means, said scavenge pump including a recirculation conduit having an upstream end in flow communication with said outlet and a downstream end in open flow communication with the fuel tank when said pump housing is mounted therein, a venturi element mounted along said recirculation conduit and defining a suction throat, and a suction line connected to said suction throat and to a fuel line for evacuating fuel from the fuel line to the fuel tank.

7. The fuel transfer pump of claim 6 wherein said scavenge pump further includes a baffle mounted along said recirculation conduit at a location downstream from said venturi element, said baffle sufficiently obstructing fuel flow through said recirculation conduit to insure priming of said venturi element.

8. A fuel transfer pump assembly for use in an inflight aircraft refueling system comprising:

a transfer pump having a pump housing defining an inlet and an outlet and mounted within an aircraft fuel tank, said transfer pump further including impeller means for pumping fuel from said inlet to said outlet;

venturi jet pump means mounted on the exterior of said pump housing by an attachment means, for recirculating from said outlet to the fuel tank a portion of the fuel pumped by said impeller means when said pump housing is mounted in the fuel tank, said venturi jet pump means defining a suction throat; and a suction line connected to said suction throat and to a fuel line to evacuate fuel therefrom.

9. The fuel transfer pump assembly of claim 8 wherein said venturi jet pump means includes a baffle mounted at a location downstream from said venturi throat, said baffle partially obstructing fuel flow through said venturi jet pump means to insure flooding and priming of said jet pump.

10. In a fuel transfer pump for submersible mounting into a reservoir fuel tank of a tanker aircraft having an off-loading fuel line to deliver fuel to an aircraft being refueled and an on-loading fuel line to receive fuel from another tanker aircraft, said fuel transfer pump including a pump housing defining an inlet and an outlet, and impeller means for pumping fuel from said inlet to said outlet, the improvement comprising;

a recirculation conduit mounted on the exterior of said pump housing by an attachment means and having an upstream end in flow communication with said pump outlet and a downstream end in flow communication with the fuel tank;

a venturi jet pump mounted along the recirculation conduit and defining a suction throat; and suction line means connected between said suction throat and at least one of said fuel lines, for evacuating fuel from said one fuel line through said suction line to the fuel tank.

11. The fuel tank pump of claim 10 further including valve means for selectively isolating said one fuel line from said fuel tank.

12. The fuel transfer pump of claim 11 wherein said venturi jet pump further includes a baffle mounted along said recirculation conduit at a location downstream from said venturi element, said baffle sufficiently obstructing fuel flow through said recirculation conduit to insure priming of said venturi element.

13. The fuel transfer pump of claim 11 wherein said suction line is connected to said on-loading fuel line.

* * * * *